United States Patent
Baumgartner et al.

(10) Patent No.: US 8,627,929 B2
(45) Date of Patent: Jan. 14, 2014

(54) DISC BRAKE

(75) Inventors: Johann Baumgartner, Moosburg (DE); Steffen Geissler, Hallbergmoos (DE); Stephan Pitzing, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 454 days.

(21) Appl. No.: 12/841,806

(22) Filed: Jul. 22, 2010

(65) Prior Publication Data

US 2011/0005872 A1 Jan. 13, 2011

Related U.S. Application Data

(63) Continuation of application No. PCT/EP2009/000134, filed on Jan. 13, 2009.

(30) Foreign Application Priority Data

Jan. 22, 2008 (DE) .......................... 10 2008 005 430

(51) Int. Cl.
 *F16D 66/00* (2006.01)
(52) U.S. Cl.
 USPC .................................................. 188/1.11 E
(58) Field of Classification Search
 USPC .... 188/1.11 R, 1.11 W, 1.11 L, 1.11 E, 18 A, 188/73.31
 See application file for complete search history.

(56) References Cited

U.S. PATENT DOCUMENTS

| | | | |
|---|---|---|---|
| 2004/0238292 A1* | 12/2004 | Ortegren et al. | 188/71.1 |
| 2005/0029056 A1 | 2/2005 | Baumgartner et al. | |
| 2008/0257657 A1* | 10/2008 | Siebke | 188/1.11 L |
| 2009/0133971 A1 | 5/2009 | Baier-Welt | |
| 2009/0320579 A1 | 12/2009 | Ante et al. | |

FOREIGN PATENT DOCUMENTS

| | | |
|---|---|---|
| DE | 198 49 309 A1 | 4/2000 |
| DE | 101 48 472 A1 | 4/2003 |
| EP | 1 748 213 A1 | 1/2007 |
| WO | WO 03/029682 A1 | 4/2003 |
| WO | WO 2008/000578 A1 | 1/2008 |

OTHER PUBLICATIONS

German Office Action dated Jun. 27, 2008 including English-language translation (Eight (8) pages).
International Search Report dated May 8, 2009 including English-language translation (Four (4) pages).

\* cited by examiner

*Primary Examiner* — Bradley King
*Assistant Examiner* — Vu Q Nguyen
(74) *Attorney, Agent, or Firm* — Crowell & Moring LLP

(57) ABSTRACT

A disc brake includes a brake caliper which engages over a brake disc and which has a caliper head and a caliper back connected thereto by tension struts. Brake pads are received in the brake caliper, are radially secured by a retaining bracket that extends in the axial direction of the brake disc, and can be forced against both sides of the brake disc. The disc brake further includes a measuring device which is connected to an evaluation unit for determining the brake application force and which is designed such that the measuring device has two base elements that can be displaced relative each other in the direction of brake application, one of the elements being a sensor and the other being a corresponding element actively connected thereto. One base element is arranged on the retaining bracket which is clamped on one side of the caliper head or on the caliper back and the other base element is arranged on the brake caliper on the side opposite the side on which the retaining bracket is clamped.

7 Claims, 1 Drawing Sheet

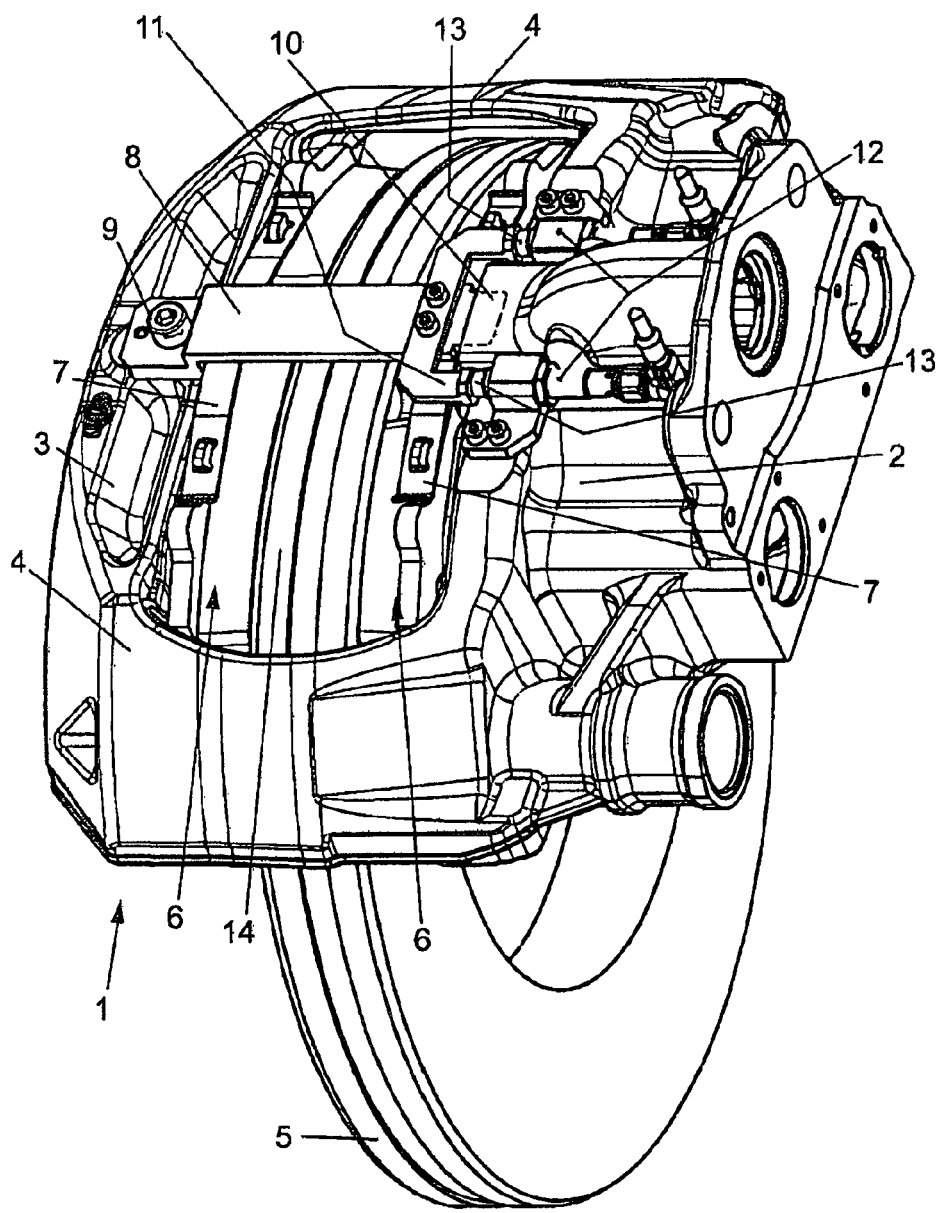

DISC BRAKE

CROSS-REFERENCE TO RELATED APPLICATIONS

This application is a continuation of PCT International Application No. PCT/EP2009/000134, filed Jan. 13, 2009, which claims priority under 35 U.S.C. §119 from German Patent Application No. DE 10 2008 005 430.5, filed Jan. 22, 2008, the entire disclosures of which are herein expressly incorporated by reference.

BACKGROUND AND SUMMARY OF THE INVENTION

The invention relates to a disc brake having a brake caliper, which fits over a brake disc and which has a caliper head and a caliper back connected thereto by tension struts. Brake pads are arranged in the caliper, which can be pressed against the brake disc from both sides and are secured radially by a retaining bracket extending in an axial direction of the brake disc. A measuring device is connected to an evaluation unit for determining the application force.

For many control tasks associated with preferably pneumatically or electromechanically actuable disc brakes, a precise knowledge of the application force applied during braking is important, this then serving as a measured variable.

Whereas it is possible with hydraulically actuated disc brakes to produce a suitable signal that correlates with the application force via the pressure of the brake fluid, determining the application force in electromechanically operated disc brakes is possible only with a considerable outlay in terms of design and production engineering.

To achieve stable closed-loop control behavior, such disc brakes are operated under position control. In this case, the position of the brake actuating element is determined by detecting the angular position of the drive motor, with the relationship between the angular position and the effect achieved by the disc brakes being subject to significant external influences. These include, for example, the wear condition, a temperature-dependent compressibility of the brake pads, the size of the release clearance, i.e. the spacing between the brake pad and a brake disc in the unbraked position, and the effects of oblique wear of the brake pads.

For these reasons, it is advantageous to obtain accurate feedback on the braking effect achieved by detecting appropriate physical states of the disc brake.

One known method of achieving this is to detect the application force by means of force sensors arranged in the force transmission path within the brake mechanism (DE 101 48 472 A1). However, it has been found in practice that these force sensors, which have to absorb clamping forces of more than 100 kN in commercial vehicle brakes, are relatively fault-prone, especially due to the rough operating conditions that prevail.

In addition to the resulting short life of the sensors, there is also the fact that the replacement which is then required can be carried out only with a considerable and, to that extent, regrettable amount of installation work since the positioning of the sensors within the brake mechanism, as necessitated by their operation, makes replacement very difficult.

Moreover, in the case of a disc brake with a plurality of pressure pieces or actuating spindles by which the brake pads can be pressed against the brake disc, there is a need for a corresponding number of sensors, and this naturally gives rise to considerable costs both for the procurement of the sensors and for their installation and connection as well as for an associated electronic evaluation system.

Overall, the method used hitherto for determining the application force, and the disc brake configured for this purpose, do not provide a satisfactory solution.

EP 1 748 213 A1 discloses a disc brake on which the application force is determined by a device, being determined substantially from the degree of expansion of a gap provided in the brake caliper. However, this presupposes an appropriate configuration of the brake caliper, which incorporates an L-shaped gap. Overall, this design of the brake caliper is associated with considerable disadvantages, among which are not only the relatively involved production process but also the permanent lack of functional reliability, which is limited especially by the risk of contamination of the gap formed.

It is the underlying object of the invention to develop a disc brake of the type in question in such a way that the application force can be determined with a low outlay in terms of design and production engineering and that the operating costs of the disc brake are reduced.

This object is achieved by a disc brake having a brake caliper, which fits over a brake disc and which has a caliper head and a caliper back connected thereto by tension struts. Brake pads are arranged in the caliper, which can be pressed against the brake disc from both sides and are secured radially by a retaining bracket extending in an axial direction of the brake disc. A measuring device is connected to an evaluation unit for determining the application force. The measuring device has two basic elements, which can be moved relative to one another in the direction of brake application, one of which is designed as a sensor and the other as a corresponding part operatively connected thereto, one basic element being arranged on the retaining bracket, which is clamped at one end on the caliper head or on the caliper back, and the other basic element being arranged on the brake caliper at the opposite end from the end at which the retaining bracket is clamped.

The invention exploits the fact that an application-induced spreading of the brake caliper, which is known from analyses of the deformation behavior of brake calipers for pneumatically actuated disc brakes, is proportional to the application force applied. At the same time, this relationship is stable over the life of the brake caliper and is subject essentially to only minimal disturbing influences, even in different operating states.

The invention is distinguished especially by the fact that it is extremely simple to implement and that the structural embodiment required for this purpose basically manages with a small number of parts that are simple to produce and to install, and which are furthermore subject to only very small operational stresses. The low outlay in terms of design and production engineering results especially from the use of the retaining bracket customarily used on disc brakes for commercial vehicles as a corresponding part to the sensor.

In one variant embodiment, the motion of the caliper back relative to the caliper head, counter to the direction of brake application, is determined by a change in the position of the retaining bracket, which is rigidly attached to the caliper head or to the caliper back, relative to the oppositely situated sensor attached to the brake caliper, and transmitted to an evaluation unit.

In principle, it is sufficient to install just one sensor, which can be attached to the outside of the brake caliper and arranged in such a way as to be unaffected by the forces acting on an application device. This results in extremely favorable positioning for installation, electrical connection and service purposes, resulting in low servicing and maintenance costs.

Any temperature dependence of the measurement signal can be adequately reduced by suitable measures. The change in the spacing between the caliper back and the caliper head resulting from heating of the brake caliper due to braking and the change in the variable which thus has to be measured is compensated by ensuring that the unilaterally fixed component corresponding to the sensor is subject to the same thermal expansion as the brake caliper itself or as the tension struts of the latter through an appropriate design configuration, an appropriate choice of materials, and an appropriate arrangement on the brake caliper.

Compensation of any faults which may occur owing to differences in thermal expansion can be accomplished through automatic initialization of the evaluation system at predetermined time intervals between the measurement operations and, if required, a correction calculation based on an evaluation of the energy converted by the brake. This initialization can be accomplished by providing for the spacing signal between the fixed component and the sensor to be detected at one-minute intervals, for example, in the unactuated position of the brake.

In the event of a braking operation, the difference between the current measurement signal measured during braking and the last value measured in the unbraked position, a zero point, is formed. In determining the application force, it is thus not the absolute value of the spacing signal which is taken as a basis but the change in said signal with respect to the respective quantity determined before a braking operation.

Further possibilities are opened up through comparison of the measured value for the caliper spread with a position signal from the motor in the case of electromechanical brake application. The determination of the application travel of the brake via the motor position signal incorporates not only the caliper spread but also the release clearance of the brake and a compression stroke due to compressibility and unevenness of the brake pads.

Given knowledge of the extent of caliper spread and brake pad wear, obtained, for example, by means of a brake pad wear sensor that is customary in production brakes, it is possible to draw conclusions about the state of the brake pads and of the current release clearance.

Given continuous monitoring of the correlation between the motor position signal and the caliper spread determined, emergency operation of the brake using the motor position signal is furthermore possible with little loss of accuracy if the sensor for measuring the caliper spread fails.

According to a preferred embodiment of the invention, the sensor can be designed as a Hall-effect sensor in correspondence with the retaining bracket forming the basic part, or with a separate basic element attached to said bracket, with the Hall-effect sensor, which is fixed with respect to the retaining bracket, being energized, while the retaining bracket is designed as a magnet or carries a magnet that moves past the Hall-effect sensor. This method makes possible a correspondingly large linear measurement range compared with one in which the retaining bracket is moved toward the sensor.

As an alternative, the corresponding part can be attached to the brake caliper and the sensor attached to the retaining bracket.

The use of a Hall-effect sensor means that only the relative movement of the retaining bracket is detected, the initial state before the start of a braking operation in each case being compared with the actual state that arises during the braking operation. Production-related tolerances or their effects on the result of measurement are thus excluded, while any changes which occur due to thermal expansion are negligible owing to the short duration of braking.

Given a maximum possible movement of the retaining bracket relative to the Hall-effect sensor of 1.5 mm, for example, a linear measurement range of 4.5 mm for the Hall-effect sensor is used. That is to say scatter in the region of 3 mm in the absolute value, due to the effects of tolerances or thermal expansion for example, i.e. twice the maximum possible measured value, can be compensated.

Since this means that it is no longer the absolute value of a spacing which is detected but now only the change in the position of the retaining bracket relative to the Hall-effect sensor, no compensation measures for disturbing influences are required. Likewise, only slight demands, if any, are made on the accuracy and, especially, the repeatability of the sensor device.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a disc brake in a perspective view.

DETAILED DESCRIPTION OF THE DRAWING

In the single FIGURE, a pneumatically or electromechanically operable disc brake is depicted, having a brake caliper 1 which fits over a brake disc 5 and in which brake pads 6 arranged on both sides of the brake disc 5 are mounted, it being possible for the brake pads to be pressed against the brake disc 5 by way of an application device for the purpose of braking.

The brake caliper has a caliper head 2 and a caliper back 3, which are connected to one another by two caliper tension struts 4 that extend in the axial direction of the brake disc 5 and delimit an installation opening 14 in the brake caliper 1 in the circumferential direction of the brake disc 5.

The brake pads 6 are held in the brake caliper 1 under a preload, for which purpose each brake pad 6 has a pad holding spring 7, on which a retaining bracket 8 is supported.

The retaining bracket 8 is connected securely to the caliper back 3 by a threaded connection or the like, such as a screw or bolt 9, while the other end is supported in a receiving pocket 10 formed in the caliper head 2 in a manner which allows for axial movement. In this arrangement, the retaining bracket 8 spans the installation opening 14 and extends lengthwise in the axial direction of the brake disc 5.

In its end region facing the receiving pocket 10, the retaining bracket 8 has a U-shaped measuring hoop 11, the two legs of which are each assigned a sensor 12, which is connected securely to the caliper head 2 and is in contactless operative connection with the associated leg of the measuring hoop 11 in the region of a measuring point 13. These sensors 12 are connected to an evaluation unit (not shown) for the purpose of determining the application force operative during braking.

During braking, the caliper head 2 and the caliper back 3 spread apart, i.e. their mutual spacing, that is to say the width of the installation opening 14, increases. This dimensional change takes effect through an increase in the size of a gap between the respective leg of the measuring hoop 11 and the associated sensor 12 at the measuring point 13 and is detected by the sensor 12.

If the sensor is designed as a Hall-effect sensor, the sensor is arranged adjacent to the retaining bracket 8 or measuring hoop 11, replacing the in-series arrangement of the measuring hoop 11 and the sensor 12 in the direction of brake application, as shown in the illustrative embodiment, and it is possible for the retaining bracket 8 to be provided as a corresponding element with a permanent magnet in the form, for example, of a bar.

TABLE OF REFERENCE NUMERALS 1 brake caliper
2 caliper head
3 caliper back
4 tension strut
5 brake disc
6 brake pad
7 pad holding spring
8 retaining bracket
9 screw
10 receiving pocket
11 measuring hoop
12 sensor
13 measuring point
14 installation opening The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, brake pads being pressable against the brake disc, the disc brake comprising:
 a caliper which, in use, straddles the brake disc, the caliper having a caliper head, a caliper back, and caliper tension struts connecting the caliper head and the caliper back;
 a retaining bracket arranged on the caliper, the retaining bracket extending in an axial direction of the brake disc and being configured to secure radially the brake pads when arranged in the caliper;
 a measuring device connectable to an evaluation unit for determining an application force, the measuring device comprising first and second components moveable relative to one another in a brake application direction, the first components being a sensor and the second components being a corresponding part operatively associated with the sensor; and
 wherein the second component is arranged on the retaining bracket, which retaining bracket is clamped at one end on the caliper back, and the first component is arranged on the caliper at an opposite end from the one end at which the retaining bracket is clamped on the caliper,
 wherein the retaining bracket is fixed on the caliper back and the sensor is fixed on the caliper head, the retaining bracket being mounted movably in a receiving pocket in the caliper head,
 wherein the retaining bracket has, as the corresponding part, a measuring hoop fixed on a free end region remote from the caliper back, wherein the sensor comprises first and second sensors, and
 wherein the measuring hoop has a U-shaped design, each leg of said U-shaped design being associated with one of the first and second sensors.

2. The disc brake according to claim 1, wherein the first and second sensor are contactless sensors.

3. The disc brake according to claim 1, wherein a heat-induced induced extension of the second component arranged on the retaining bracket corresponds to an extension of the caliper tension struts under a same thermal stress.

4. The disc brake according to claim 1, wherein the first and second sensors are designed as Hall-effect sensors.

5. The disc brake according to claim 4, wherein the retaining bracket comprises a bar-shaped permanent magnet corresponding to the Hall-effect sensors.

6. The disc brake according to claim 4, wherein the Hall-effect sensors are arranged adjacent to the retaining bracket in the brake application direction.

7. The disc brake according to claim 5, wherein the Hall-effect sensor are arranged adjacent to the retaining bracket in the brake application direction.

\* \* \* \* \*